(12) United States Patent
Glötzl et al.

(10) Patent No.: US 8,109,697 B2
(45) Date of Patent: Feb. 7, 2012

(54) AIR CONVEYOR WITH A DEVICE FOR ORIENTING BOTTLES VERTICALLY

(75) Inventors: Reiner Glötzl, Pentling (DE); Hermann Klarl, Thalmassing (DE); Andreas Seidl, Donaustauf (DE)

(73) Assignee: Krones AG, Neutraubling (DE)

( * ) Notice: Subject to any disclaimer, the term of this patent is extended or adjusted under 35 U.S.C. 154(b) by 150 days.

(21) Appl. No.: 12/248,406

(22) Filed: Oct. 9, 2008

(65) Prior Publication Data

US 2009/0092450 A1    Apr. 9, 2009

(30) Foreign Application Priority Data

Oct. 9, 2007  (DE) .......................... 10 2007 048 545

(51) Int. Cl.
*B65G 47/24* (2006.01)
(52) U.S. Cl. .......................................... 406/87
(58) Field of Classification Search ............... 406/86, 406/87, 88
See application file for complete search history.

(56) References Cited

U.S. PATENT DOCUMENTS

| | | | | |
|---|---|---|---|---|
| 5,028,174 A | * | 7/1991 | Karass | 406/88 |
| 5,161,919 A | * | 11/1992 | Smith et al. | 406/86 |
| 5,246,097 A | * | 9/1993 | McCoy et al. | 198/448 |
| 5,246,314 A | | 9/1993 | Smith et al. | |
| 5,299,889 A | * | 4/1994 | Langenbeck | 406/88 |
| 5,437,521 A | * | 8/1995 | Ouellette | 406/88 |
| 5,484,237 A | * | 1/1996 | Langenbeck | 406/86 |
| 5,820,306 A | | 10/1998 | Hilbish et al. | |
| 5,984,591 A | * | 11/1999 | Hilbish et al. | 406/88 |
| 6,368,027 B1 | * | 4/2002 | Trenel et al. | 406/87 |
| 6,514,015 B1 | * | 2/2003 | Trenel et al. | 406/86 |
| 6,685,401 B1 | * | 2/2004 | de Almeida Rodrigues et al. | 406/11 |
| 2002/0192038 A1 | * | 12/2002 | Trenel et al. | 406/88 |

FOREIGN PATENT DOCUMENTS

| | | |
|---|---|---|
| FR | 2781470 | 1/2000 |
| FR | 2796052 | 1/2001 |
| FR | 2806067 | 9/2001 |
| FR | 2807414 | 10/2001 |
| WO | WO0142113 A1 * | 6/2001 |
| WO | WO-01/60724 | 8/2001 |

OTHER PUBLICATIONS

European Search Report for EP 08017246.3 dated Jan. 8, 2009.

* cited by examiner

*Primary Examiner* — Gene Crawford
*Assistant Examiner* — William R Harp
(74) *Attorney, Agent, or Firm* — Marshall, Gerstein & Borun LLP

(57) ABSTRACT

An air conveyor for transporting plastic bottles, in which bottles are driven by applying air, in the area of the bottle openings. In a partial area of the air conveyor, means are provided to apply air to the bottle bodies. These means are arranged such that the bottles are essentially oriented vertically with the openings of the bottles facing upwards and the bottom of the bottles facing downwards.

4 Claims, 5 Drawing Sheets

AIR CONVEYOR WITH A DEVICE FOR ORIENTING BOTTLES VERTICALLY

CROSS-REFERENCE TO RELATED APPLICATION

The present application claims the benefit of priority of German Patent Application No. 102007048545.1 filed Oct. 9, 2007. The entire text of the priority application is incorporated herein by reference in its entirety.

FIELD OF THE DISCLOSURE

The disclosure relates to an air conveyor for transporting plastic bottles by applying air to the opening area of the bottles geared to a method of transporting plastic bottles with an air conveyor.

BACKGROUND

Air conveyors are frequently used for transporting plastic bottles in industrial plants. In such plants, the bottles are in most cases suspended with their supporting rings in guide rails and are moved forward by means of air. As no complex mechanism is required for this type of progressive movement, such a plant is less susceptible to failures.

In a known air conveyor of the applicant, the application of air is effected in the area of the bottle openings, whereby the driving force mainly acts on the bottle openings. With this method, more than 30,000 bottles per hour can be transported in an air conveyor, and the transport speeds are correspondingly high.

However, as speed is increasing, aerodynamic drag also plays an increasing role. As aerodynamic drag is highest in the area of the largest surfaces of action of the bottles and as only at the bottle openings air is applied to the bottles, the bottles have a very oblique position. This oblique position of the bottles does not have any negative effect when the bottles are being transported. However, when a bottle is to be transferred to another transport device (e.g. a sawtooth or zigzag star) at the end of an air conveyor, the oblique position of the bottles can cause difficulties.

SUMMARY OF THE DISCLOSURE

Therefore, the object underlying the present disclosure is to render the bottle transfer to another conveyor in the end area of an air conveyor essentially less susceptible to failures without slowing down the bottles in the process.

Bottles usually comprise a more or less pronounced supporting ring in the opening area which is required for manipulation purposes in the production and/or in the further treatment in subsequent plants. The air conveyor for transporting plastic bottles moves the bottles by applying air to the bottle openings, the bottles to be transported hanging with their supporting ring at a rail. During transport, the bottles are in an oblique position. To orient the bottles in the end area of the air conveyor as vertically as possible, in a partial area, preferably at the end of the air conveyor, means are provided to apply air to the bottle bodies. These means are arranged such that the bottles are essentially oriented vertically, i.e. the openings of the bottles face upwards and the bottoms of the bottles face downwards.

The application of air to the bottle bodies is performed such that the oblique position of the bottles decreases and the bottles are oriented as vertically as possible. The deviation of the thus oriented bottles from the vertical is less than 10° and preferably less than 5°.

When air is being applied to the bottle bodies, the air is preferably blown against the bottle bodies from the side or diagonally from the side. However, embodiments of the disclosure are possible, where air is blown against the bottle bodies from behind, from the bottom or diagonally from the bottom. Possible airflow angles to the direction of movement or transport of the bottles can be of any values from 0° to 90°.

To apply air to the bottle bodies, guide plates are typically used which are provided with gills or nozzles. Gills are slits worked into a guide plate through which air flows out in a preferred direction. Guide plates with nozzles are more complicated to manufacture, but permit a very precise airflow. Embodiments with combinations of gills and nozzles are also conceivable. The gills or nozzles can be located at different levels at the guide plates. For example, the gills or nozzles can be arranged in diagonal rows on the guide plates, preferred angles to the longitudinal sides of the guide plates being in a range of 20° to 40°. The arrangement of the gills or nozzles at different levels or the diagonal arrangement of the gills or nozzles permits to transport and vertically orient bottles of different sizes and different oblique positions in one and the same air conveyor. In case of bottles with a lower or higher own weight, the blowing strength can be correspondingly decreased or increased.

For the air supply, usually blower fans, compressors or an external air supply are employed. The air supply to the bottle bodies is either the same air supply as for the bottle openings, or a separate air supply is used for applying air to the bottle bodies.

Furthermore, the air conveyor can comprise means for applying air to the bottle bodies, namely one or several detectors for detecting the oblique position of individual bottles, and a control of the air supply which can take into consideration the detected oblique position of the bottles. In this manner, bottles with a more oblique position can be blown at with a stronger flow than bottles with a less oblique position, so that, if possible, in the end area of the air conveyor all bottles are oriented vertically as precisely as possible after air has been applied to the bottle bodies.

Furthermore, the air conveyor can typically comprise one or several hooks in the end area by which arriving bottles can be abruptly slowed down or stopped. This procedure can become necessary if the bottle transport in the air conveyor has to be quickly interrupted.

The method of transporting plastic bottles with an air conveyor comprises applying air in the area of the bottle openings to drive the bottles. Additionally, in a partial area, for example at the end of the air conveyor, air is applied to the bottle bodies to orient the bottles towards the vertical.

When the bottles are being oriented, a completely vertical orientation is typically strived for, where deviations from the vertical should be less than 5°.

To orient the bottles vertically, air can be blown against the bottle bodies at an angle between the airflow direction and the transport direction of the bottles in a range of 0° to 90°. When the bottles are being oriented vertically, the speed of the bottles is not decreased (as, in addition to the total movement of the bottle, the bottle body moves forward, i.e. in the direction of movement of the bottle).

In a further embodiment of the disclosure, the method of transporting plastic bottles with an air conveyor comprises additional steps. To be able to orient the bottles in the end area of the air conveyor more precisely vertically, the oblique position of individual bottles is first detected, and then this information is used to adjust the application procedure in the end area of the air conveyor, so that the airflow against bottles with a more oblique position is stronger than against bottles with a less oblique position. This leads to bottles with different oblique positions being oriented as uniformly or as precisely vertically as possible.

BRIEF DESCRIPTION OF THE DRAWINGS

Further aspects of possible embodiments of the disclosure will become clear with reference to the Figures. In the drawings:

FIG. 1b shows a schematic view of a bottle in an air conveyor which is in a less oblique position than the bottle in FIG. 1a;

DETAILED DESCRIPTION

FIG. 1 illustrates the vertical orientation of a bottle 101 in an air conveyor. The air conveyor comprises, among others, two guide rails 103 situated at the same level at opposite sides, in FIG. 1 only one of them being shown. The guide rails 103 are arranged in pairs in parallel to each other. The distance between two guide rails 103 is selected such that the neck of a bottle just fits between the two guide rails 103 and the bottle 101 rests with the supporting ring of the bottle on the two guide rails 103. In the indicated air conveyor, air is applied to the bottle opening 102, so that the bottle 101 slides on the guide rails 103. The total direction of movement of the bottle 101 is indicated by an arrow. In FIG. 1a, the bottle 101 is in an extreme oblique position as only in the area of the bottle opening 102, air is applied to the bottle 101, and as the aerodynamic drag caused by the progressive movement mainly acts on the bottle body.

Figure 1A:
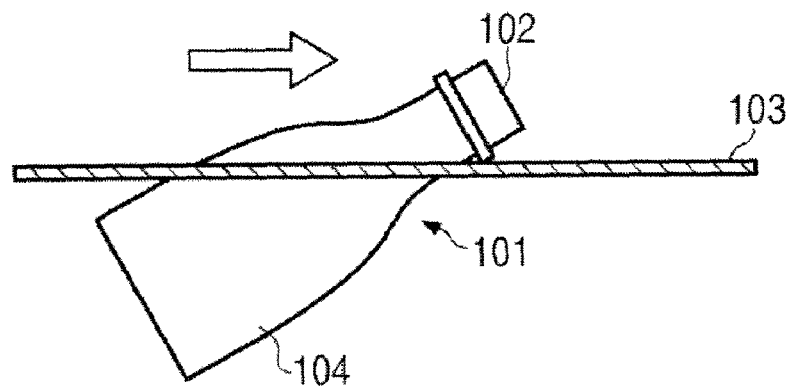
FIG. 1a shows a schematic view of a bottle in an air conveyor which is in an extremely oblique position.
Figure 1B:
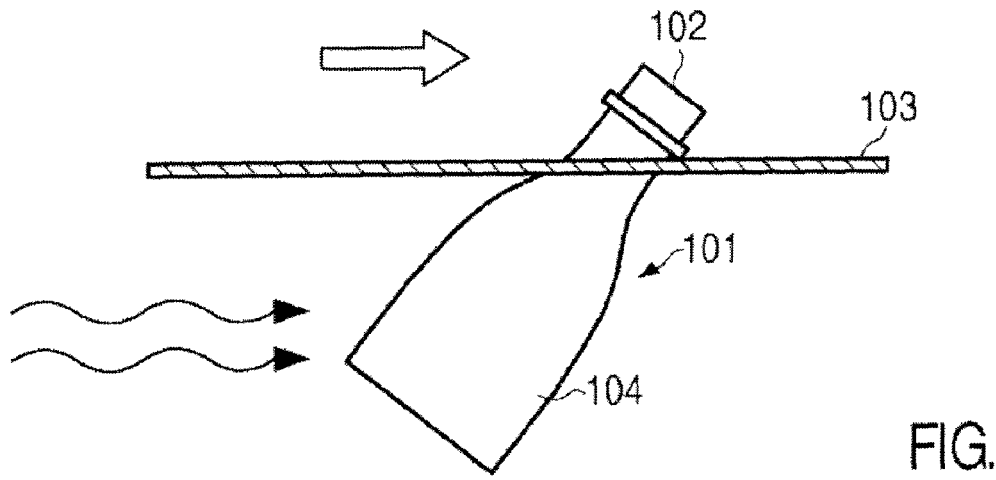
Figure 1C:
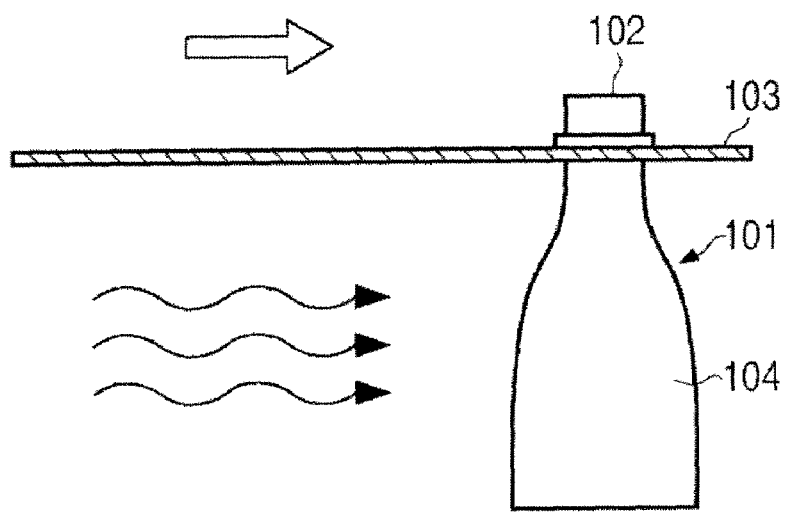
FIG. 1c shows a schematic view of a bottle in an air conveyor which is oriented vertically.
Figure 1D:
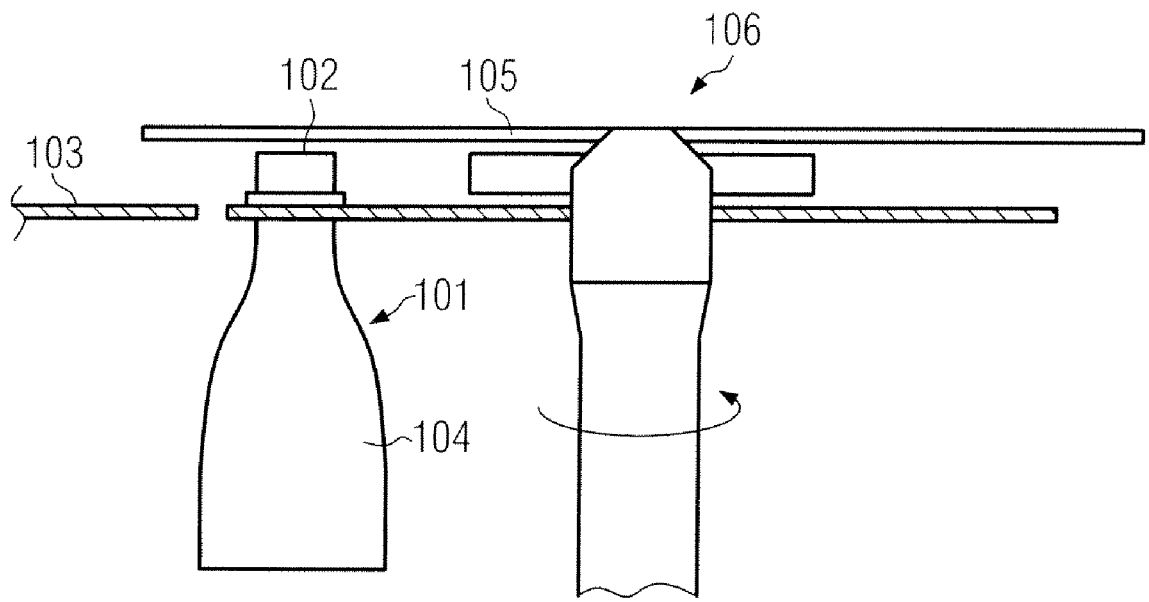
FIG. 1d shows a schematic view of a bottle as transferred by an air conveyor to a further unit, such as a sawtooth or zigzag star.

In FIG. 1b, air is additionally applied to the bottle body 104 (wavy arrows), so that the bottle 101 starts to orient vertically. In FIG. 1c, the completely vertically oriented bottle 101 can be seen. The additional admission of air to the bottle body 104 permits to increase the capacity of an air conveyor in an exemplary embodiment from 30,000 bottles per hour up to 120,000 bottles per hour.

Figure 2:
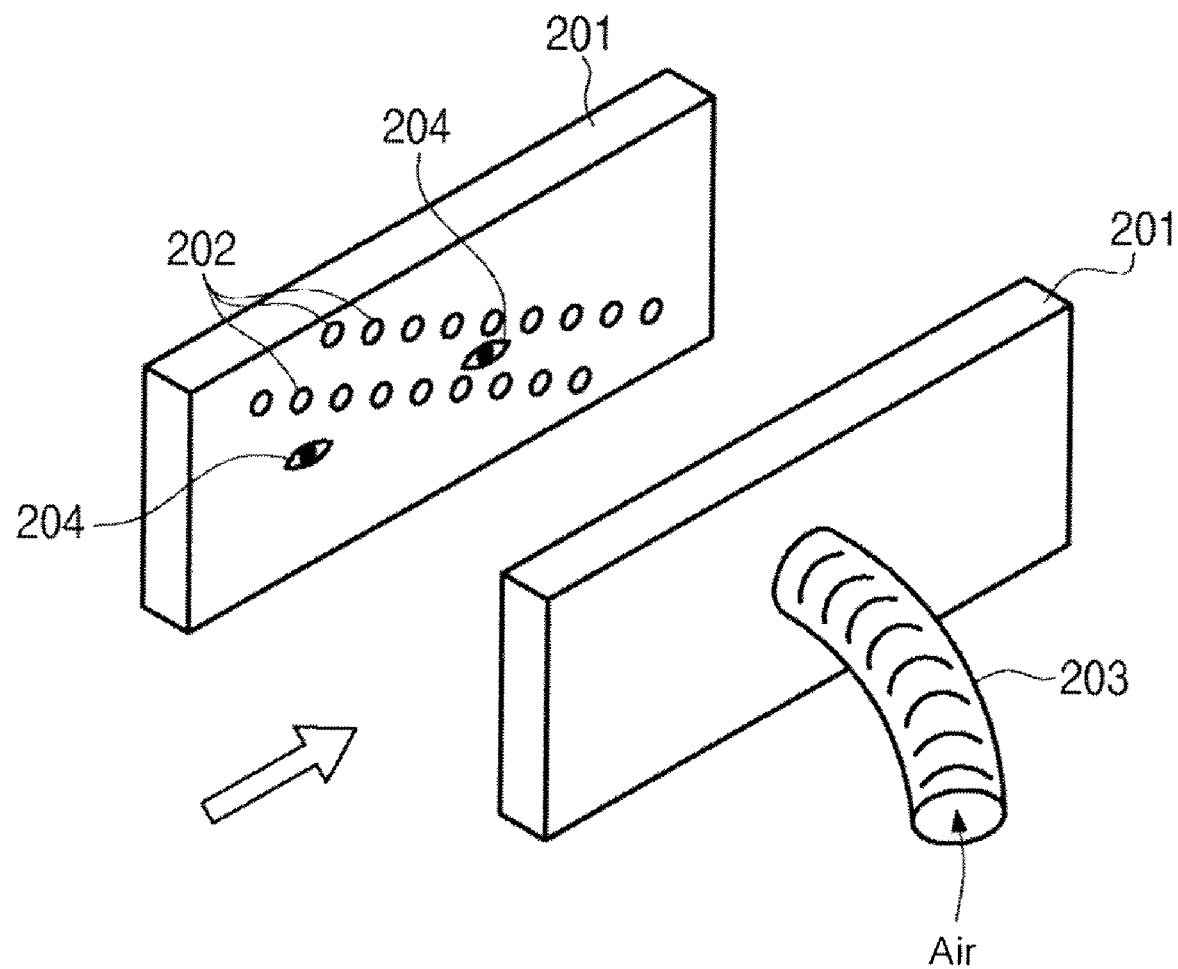
FIG. 2 shows a schematic view of an air conveyor with guide plates.

FIG. 2 shows a part of an air conveyor according to a possible embodiment of the disclosure. The main direction of movement of the bottles is indicated by an arrow. Two guide plates 201 are arranged in parallel to each other, both guide plates 201 being equipped with gills or nozzles 202 which are supplied with air by one or several air supplies 203. The gills or nozzles 202 can be arranged, for example, in one or several rows on a guide plate 201. Preferably, these rows extend diagonally, so that the gills or nozzles 202 are located at different levels at the guide plate 201.

Optionally, one or several detectors 204 are attached to one or both guide plates 201 and can detect the oblique position of individual bottles 101. The output signals of the detectors 204 can be forwarded to a control (not shown) and then be used to improve the vertical orientation of individual bottles 101 in that the control instructs, for example, the air supply to supply more or less air, corresponding to the oblique position of individual bottles 101. It is also possible to actuate valves (e.g. solenoid valves) to control the airflow, so that individual bottles 101 can be oriented vertically by a directed airflow. The detectors 204 can be located at various points of a guide plate 201 or, depending on the construction, in front of or behind a guide plate 201. The detector position is, for example, further in the front to first be able to detect the oblique position of a bottle and further in the back to be able to check, after air has been additionally applied to the bottle body 104, whether the bottle 101 is oriented sufficiently vertically.

Figure 3A:
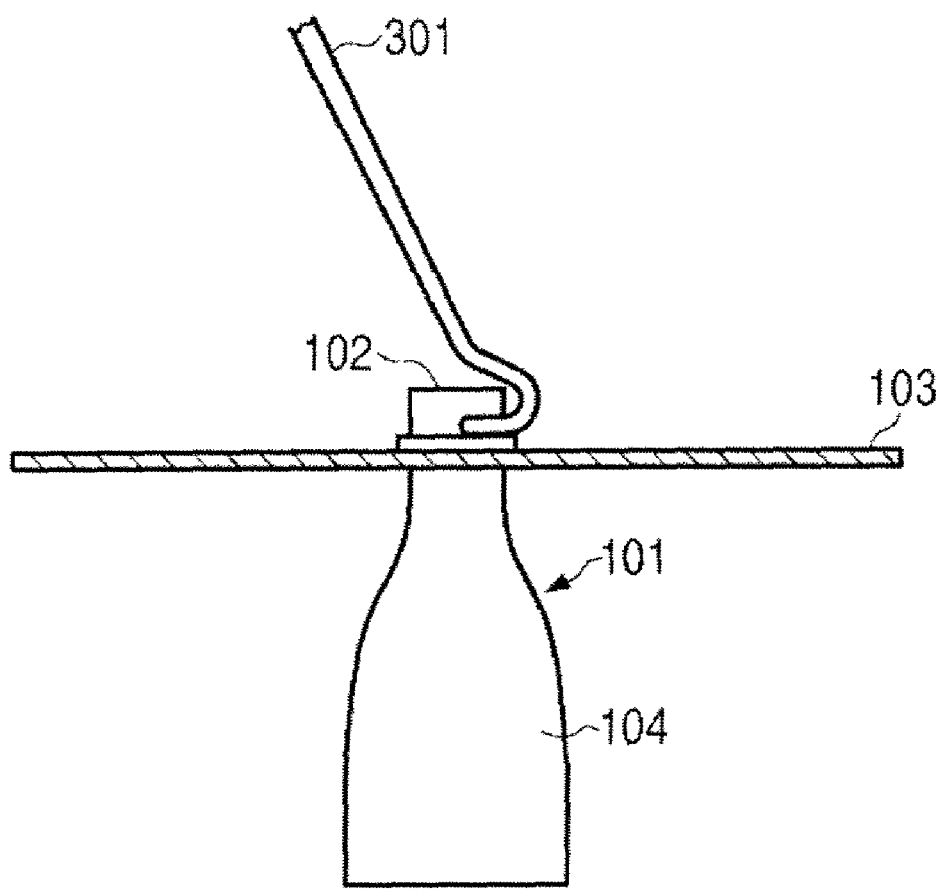
FIG. 3a shows a schematic side view of a bottle in an air conveyor which is held with a hook.
Figure 3B:
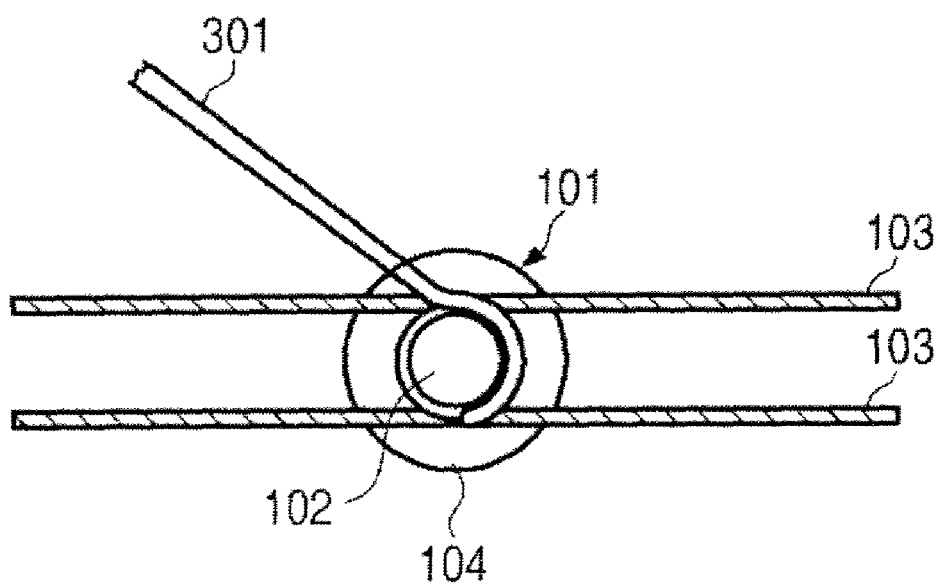
FIG. 3b shows a schematic plan view of a bottle in an air conveyor which is held by a hook.

Another possible aspect of the disclosure is drawn in FIG. 3. To be able to stop bottles 101 as quickly as possible, a hook 301 grips at the neck of the bottle near the bottle opening 102, so that a further movement of the bottle 101 (in this case from left to right) is prevented. FIGS. 3a and 3b show the same scenario, in one case from the side and in the other case from above.

To prevent, in the end area of a bottle conveyor, quickly arriving bottles 101 from rising upwards (or from no longer resting on the guide rails 103), a hold-down disk 105 can be used which is located just above the bottle openings 102. This can prevent bottles 101 from wedging or being damaged during the transfer to further units, such as e.g. a sawtooth or zigzag star 106.

Figure 4:
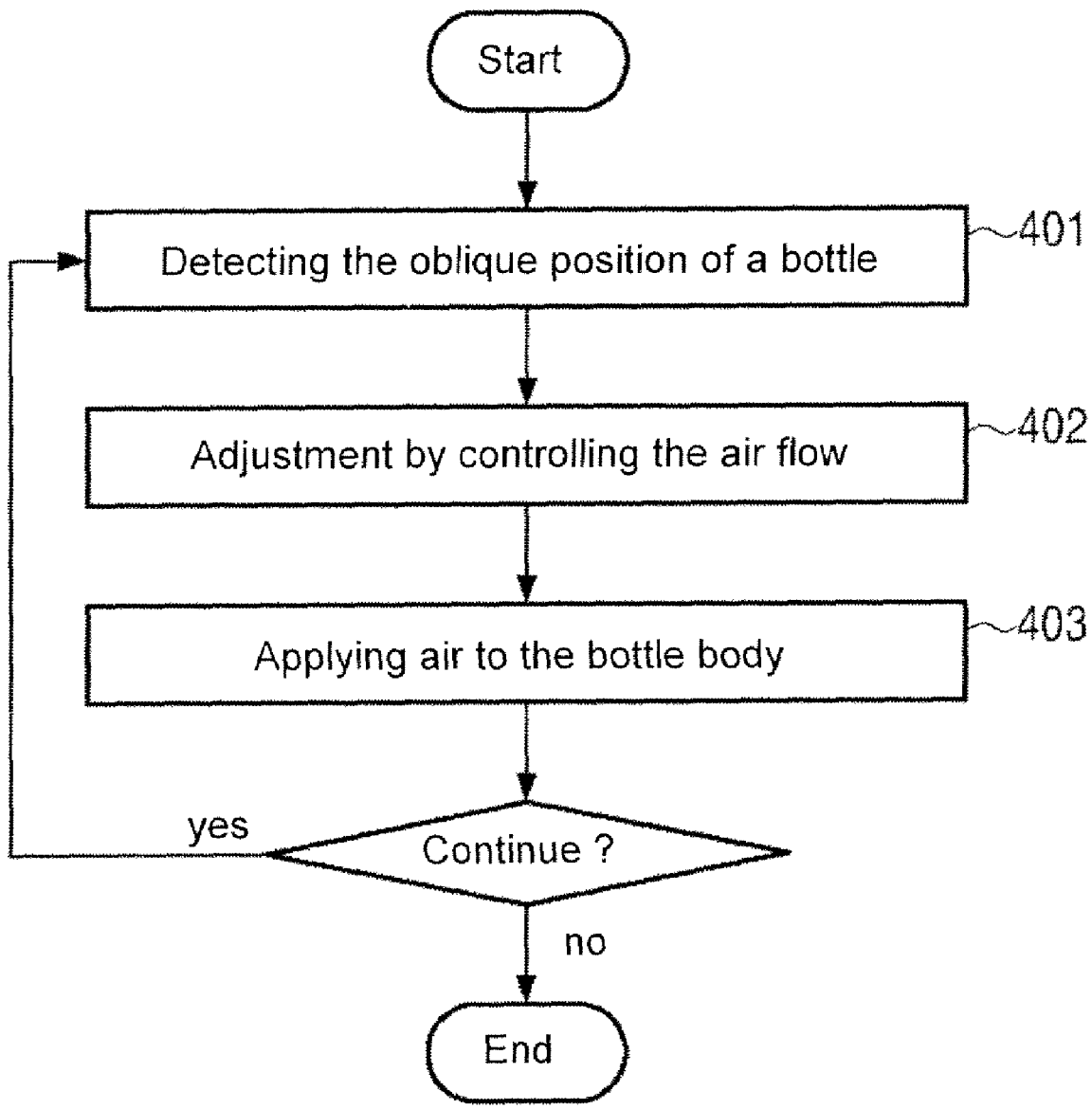
FIG. 4 shows a process sequence for orienting bottles as vertically as possible.

FIG. 4 shows an exemplary process sequence for orienting bottles vertically. In step 401, first the oblique position of a bottle is detected to get an indication of how strong the airflow against the bottle has to be. This information is used in step 402 to control or adjust the airflow for blowing against bottles. In step 403, air is applied to the bottle body, the oblique position of the bottle being taken into consideration by adjusting the airflow. If there are several detectors, there is the possibility of passing this cycle several times and of taking into consideration the current oblique position of a bottle in each case. Furthermore, there is the possibility of taking into consideration a residual oblique position of the bottles oriented in the direction of the vertical to be able to orient subsequent bottles even more precisely.

The invention claimed is:

1. Method of transporting a plurality of bottles with an air conveyor, comprising:
   applying air to the bottle openings of the bottles during bottle transportation whereby the bottles are in an oblique position, and
   in an end area of the air conveyor, additionally applying air to the bodies of the bottles to orient the bottles essentially vertical whereby the orientation of the bottles changes from an oblique position to an essentially vertical position,
   wherein effecting the vertical orientation of the bottles can be achieved without reducing the speed of said bottles,
   wherein the air-applying device comprises guide plates provided with one of gills, nozzles, and a combination thereof for the application of air,
   wherein the one of the gills, nozzles, and a combination thereof are located at different levels at the guide plates to permit transport and vertical orientation of bottles of different sizes and different oblique positions in one and the same air conveyor, and preventing the bottles from rising upwards with a hold-down disk located in the end area of the bottle conveyor, and transferring them to a sawtooth or zigzag star.

2. Method according to claim 1, wherein, after the application of air to the bottle body a deviation of the bottles from vertical is less than one of 1°, 2°, 3°, 4°, 5°, 6°, 8° or 10°.

3. Method according to claim 1, wherein, during bottle transportation, an angle between an airflow direction of the applied air and a transport direction of the bottles is in a range of one of 0°, 15°, 30°, 45°, 60° or 75° to one of 15°, 30°, 45°, 60°, 75° or 90°.

4. Method according to claim 1, further comprising:
detecting the oblique position of the bottles; and
adjusting an airflow of the applied air in an end area of the air conveyor, wherein a stronger airflow is applied to bottles with a more oblique position than to bottles with a less oblique position.

\* \* \* \* \*